E. W. STEWART.
SAFETY CRANK FOR SPRING MOTORS.
APPLICATION FILED MAY 21, 1917.
1,260,829.
Patented Mar. 26, 1918.
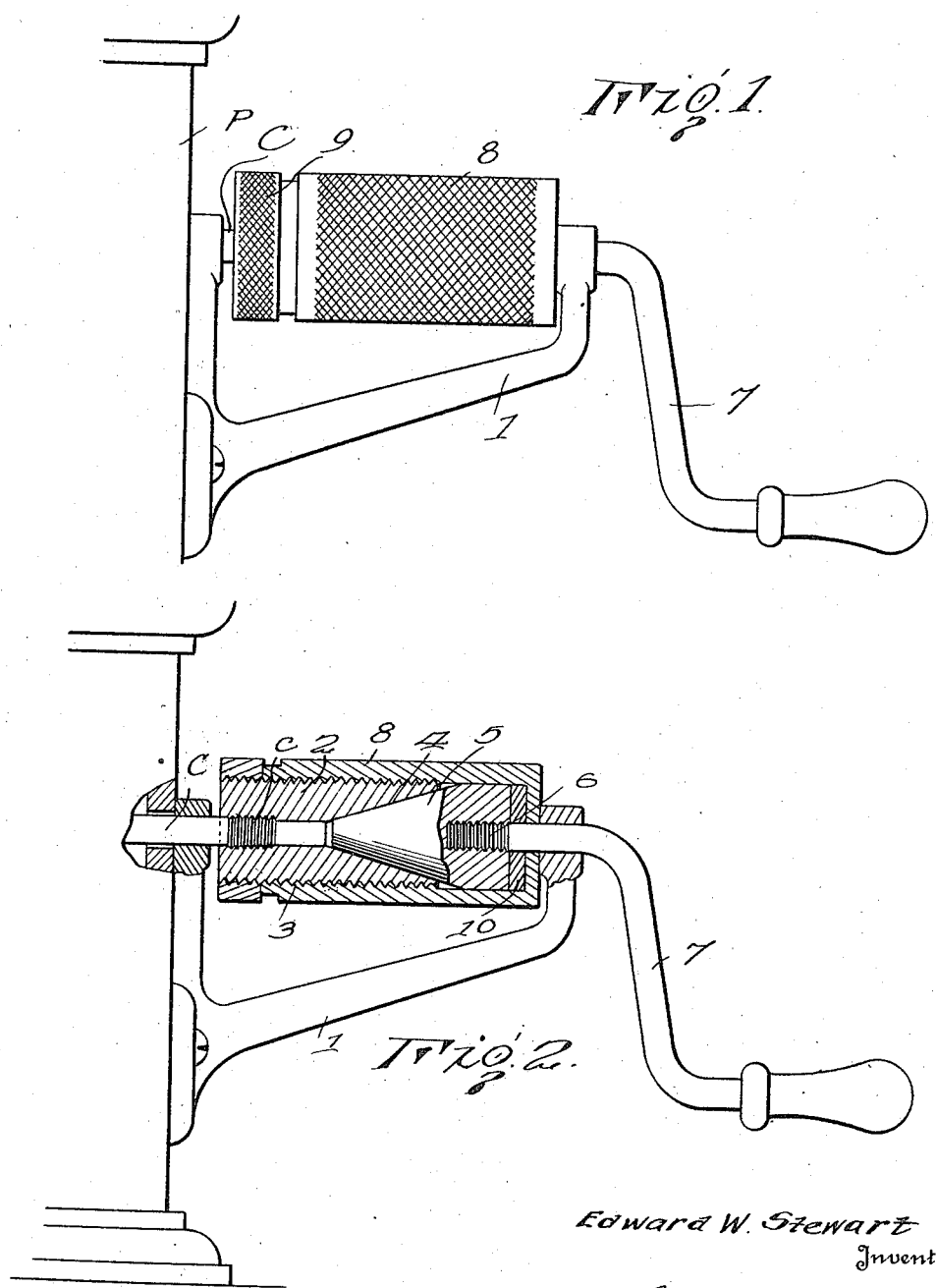

UNITED STATES PATENT OFFICE.

EDWARD W. STEWART, OF SANDUSKY, OHIO.

SAFETY-CRANK FOR SPRING-MOTORS.

1,260,829.　　　Specification of Letters Patent.　　Patented Mar. 26, 1918.

Application filed May 21, 1917.　Serial No. 169,986.

*To all whom it may concern:*

Be it known that I, EDWARD W. STEWART, a citizen of the United States, and resident of Sandusky, in the county of Erie and State of Ohio, have invented certain new and useful Improvements in Safety-Cranks for Spring-Motors, of which the following is a specification.

This invention relates to cranks of the type employed for winding the springs of spring motors of phonographs and the like and it is the dominant object of the invention to provide a crank having a novel form of clutch interposed therein, the same serving as a safe guard against the winding of the motor spring too tight, which oftentimes causes the breaking or disabling of the same.

Among other aims and objects of the invention may be recited, the provision of a device of the character mentioned with a view to compactness, and in which the number of parts are few, the construction simple, the cost of production small, and efficiency and operation high.

All of the foregoing together with additional advantageous details and arrangements of parts of the preferred embodiment of my invention will be clear from the description hereinafter contained, when read in connection with the accompanying drawings forming parts hereof, wherein said embodiment of the invention is illustrated for the purpose of facilitating a full understanding of the present improvements.

In the drawings:

Figure 1 is a side elevation of my improved crank as applied to the crank shaft of a phonograph spring motor; and Fig. 2 is a longitudinal section therethrough.

Referring now more specifically to the several figures of the drawings and in connection with which like reference characters will refer to the same parts in the several views, the letter P designates the crank side of the cabinet of a phonograph having the crank shaft C extending therefrom, the outer end of which is screw threaded as at $c$. A bracket 1 having an apertured outer end is secured to the crank side of the phonograph casing C and serves as means for rotatably supporting the outer portion of the improved crank, which will be hereinafter more fully described.

The screw threaded portion $c$ of the crank shaft C is passed into engagement with a bearing 2 preferably formed of bronze and having other screw threads 3 arranged upon its outer face or periphery and a conical seat 4 formed in one end thereof. Into the conical seat 4 a crank cone, preferably formed of steel and designated by the numeral 5 is inserted, the said cone having a screw threaded pocket formed in its outer end adapted for receiving the complementally threaded extremity 6 of the crank handle 7.

About the bearing 2 and the crank cone 5 an internally threaded sleeve 8 is arranged, the sleeve being locked in adjusted position through the medium of a knurled nut 9 engaged with the remaining screw threaded portion of the bearing 2. A thrust washer 10 composed of fiber is arranged between the sleeve and the crank cone and obviously, compensates for thrust and wear on the same. By engaging the internally screw threaded sleeve 8 with the locking nut 9, it is to be understood that the frictional clutch afforded by the bearing 2 and the crank cone 5 may be adjusted to secure the same at any tension equal to that of the wound spring, but which will allow the cone to slip within its seat, namely, the conical seat 4, at any tension above that. Thus, overwinding of the motor spring is eliminated.

Manifestly, the construction shown is capable of considerable modification and such modification as is within the scope of my claims, I consider within the spirit of my invention.

I claim:

1. A crank carrying a cone upon one end thereof, a bearing having a conical pocket formed therein for receiving said cone and a screw threaded pocket formed in its free end, means for connecting the cone and the bearing, and means engaged with said first means for locking the same at a desired tension.

2. A crank carrying a cone on one end thereof, a screw threaded bearing having a conical seat for receiving the cone, and adjustable means arranged about the cone and the bearing for coupling the same.

3. A crank carrying a cone on one end thereof, a screw threaded bearing having a conical seat for receiving the cone, an internally threaded sleeve arranged about the cone and said bearing for coupling the same, and means engaged with said sleeve for locking the same in an adjusted position.

In testimony whereof, I affix my signature hereto.

EDWARD W. STEWART.

Copies of this patent may be obtained for five cents each, by addressing the "Commissioner of Patents, Washington, D. C."